United States Patent [19]

Legallasi et al.

[11] 4,284,249
[45] Aug. 18, 1981

[54] DEVICE TO UNROLL AND TO ROLL UP ELONGATED FLEXIBLE ARTICLES SUCH AS CONDUITS OR CABLES

[75] Inventors: Lucien Legallasi, Orgeval; Guy Planquette, Palaiseau; Remi Reynard, Neuilly-sur-Seine, all of France

[73] Assignee: Coflexip, Rueil Malmaison, France

[21] Appl. No.: 135,313

[22] Filed: Mar. 31, 1980

[30] Foreign Application Priority Data

Apr. 6, 1979 [FR] France ............................. 79 08774

[51] Int. Cl.³ .................. B65H 75/00; B21C 47/24
[52] U.S. Cl. ........................... 242/54 R; 242/78.6; 242/80
[58] Field of Search ........... 242/54 R, 67.1 R, 78.1, 242/78.6, 80, 82

[56] References Cited

U.S. PATENT DOCUMENTS

| | | | |
|---|---|---|---|
| 2,177,577 | 10/1939 | Mikaelson | 242/78.6 |
| 2,298,759 | 10/1942 | Fouse | 242/78.6 X |
| 2,915,257 | 12/1959 | Bruns | 242/78.6 |
| 3,955,770 | 5/1976 | Offermann | 242/78.6 |
| 4,098,468 | 7/1978 | Skalleberg | 242/54 R |

Primary Examiner—Edward J. McCarthy
Attorney, Agent, or Firm—Brisebois & Kruger

[57] ABSTRACT

A system for winding or unwinding lengths of an elongated article such as an underwater conduit or cable, in succession, from a plurality of spools. The system includes two spaced apart spindles which can be moved vertically, horizontally in the direction of unwinding of the article, and toward each other, so that the spindles can be used to handle the spools when the spools are supported with their axes perpendicular to the direction of unwinding of the article. By this arrangement, one spool can be unwound, deposited on the deck of a ship, and the spindles can be moved to the second spool to pick up the spool for unwinding. The system can be used to unwind lengths of underwater conduit, during the laying of the conduit in a marine environment.

13 Claims, 11 Drawing Figures

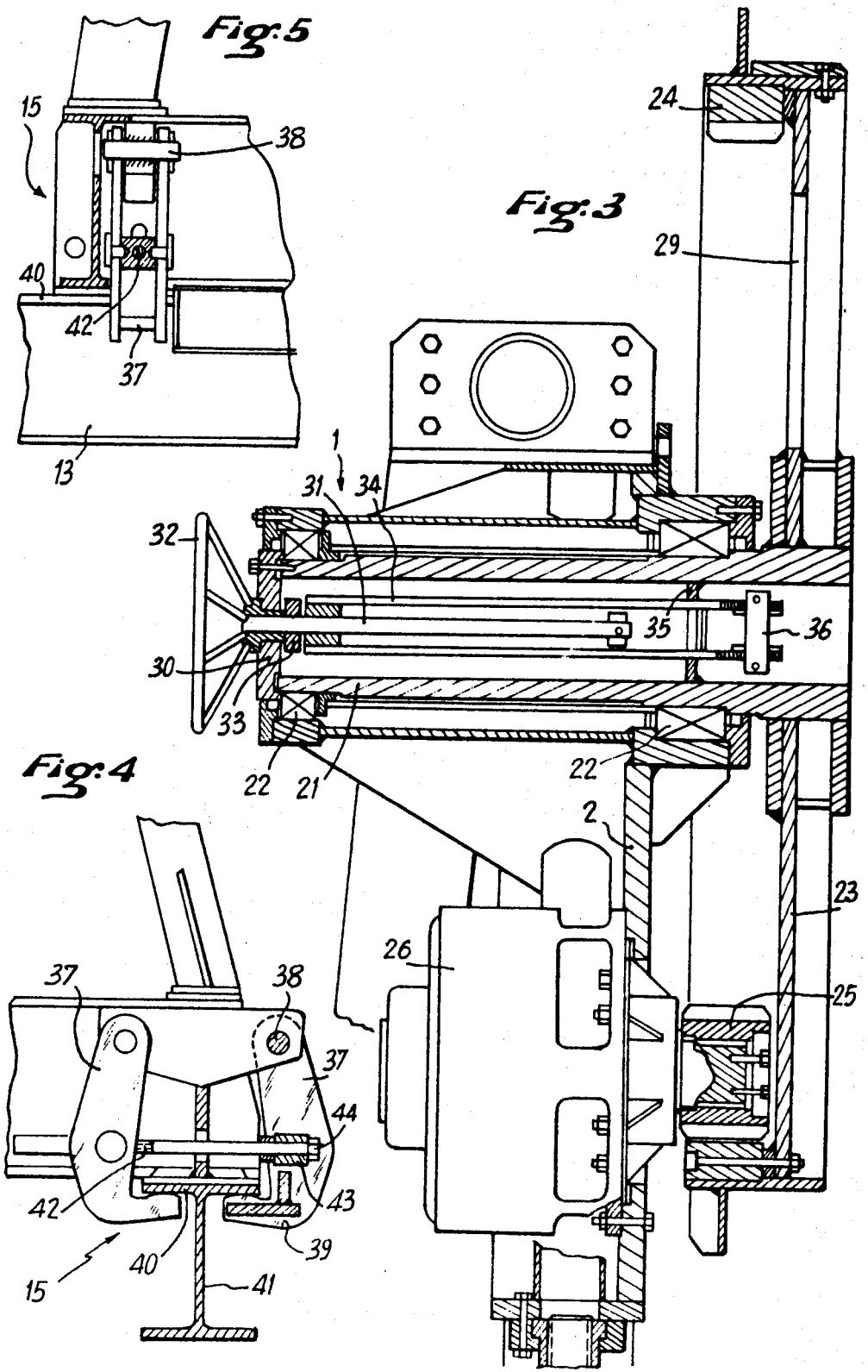

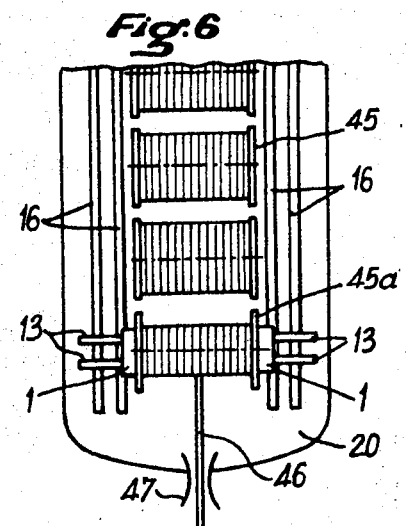
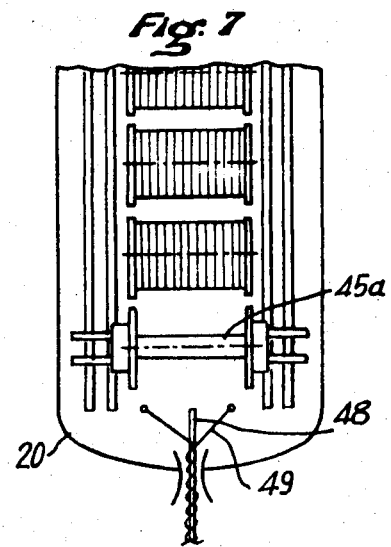
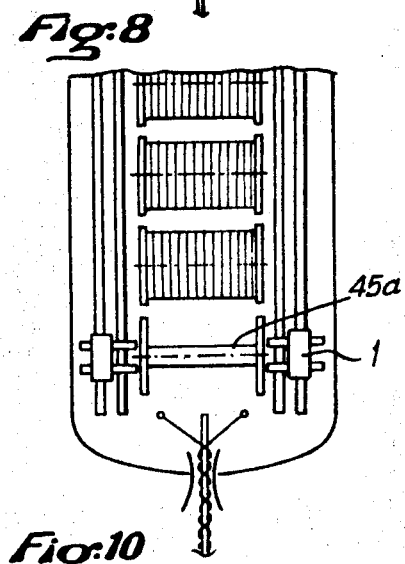
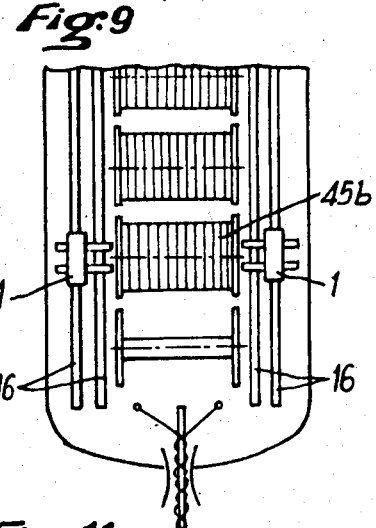
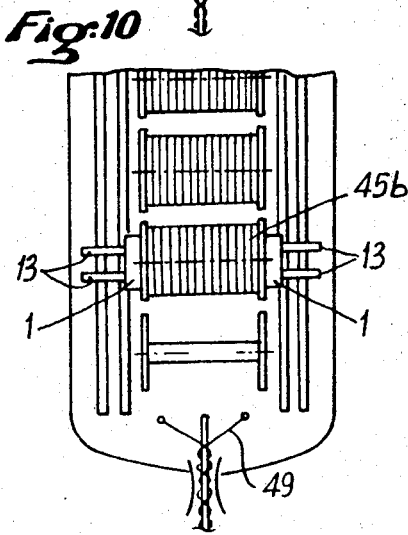
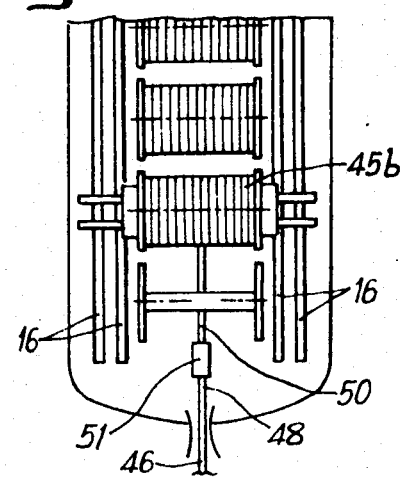

DEVICE TO UNROLL AND TO ROLL UP ELONGATED FLEXIBLE ARTICLES SUCH AS CONDUITS OR CABLES

SUMMARY OF THE INVENTION

The present invention relates to a device to unroll or to roll up elongated flexible articles such as tubes, conduits or cables.

Such devices are already known, being installed principally on ships for laying underwater tubes or cables. These devices comprise essentially a winch to which is attached a spool on which is wound the cable or the tube.

It is relatively frequent, in this type of installation, that the weight of the filled spool can be several hundred tons. In this case, when there is not available on the ship means for handling of such filled spools, it is necessary to carry out the laying of the underwater cable or the tube by sections of a length equal to the maximum length practical on the spool. After the laying of one section, the free end of the section is left in the sea and the ship must return to port so that the empty spool can be replaced with a full spool by means of cranes or other methods of manipulation available in that port. The ship returns then to the sea where the end of the last section laid is recovered, to be attached to the new section carried by the full spool now aboard the ship.

To the complexity and the slowness of such an operation is added the additional inconvenience that few ports are equipped with means for handling loads of this size. The distance between the site of the laying of the cable or the tube and the port which stocks the full spools is in consequence occasionally very great. Because of the costs of such use of ships, it follows that the laying of underwater cables or tubes in successive sections is very expensive.

The present invention alleviates such disadvantages and provides a device to unroll or to roll up elongated flexible articles such as tubes or cables, which offers a storage capacity very much greater than that of a single spool.

For this purpose, this invention presents a device of the above type characterized by the fact that it provides in combination, at least two spindles forming a winch, supported on a basically horizontal surface and capable of receiving, one after the other, at least two spools on each of which it is possible to roll up a length of such an article, the axes of the spools being basically perpendicular to the direction of unrolling of the article, means for displacing the spindles parallel to the horizontal surface, in the direction of unrolling of the article, means to displace the spindles parallel to the surface, in a direction perpendicular to the direction of unrolling, and means to raise or lower the spindles vertically.

One recognizes then that the capacity of such a device depends only on the available surface, for example, the deck of a support ship, on which could be placed several spools receiving the tubes or the cables. The spindles of the winch being mobile, preferably motorized, it is not necessary to provide means for handling spools aboard the support ship.

In a preferred embodiment of the invention, each of the spindles is mounted on a support which can slide vertically in a frame, the means for raising the spindles being placed to act between the support and the said frame.

Thus, the means for raising the spindles permit the sliding of the spindles in relation to the frame such that the spools themselves are raised, which then allows the winch to drive them in rotation.

Advantageously, the means for rotating the spindle are integrated with them.

Preferably, at least two tracks are fixed on the ship's surface, parallel to the direction of the unwinding of the article, on each side of the receiving zone for the spools, the tracks supporting a carriage carrying the frame, the means for displacing the spindles in the direction of unwinding the article being mounted on this carriage to allow it to be moved on the tracks.

Preferably, equally, the carriage has at least two slides placed perpendicularly to the direction of the unwinding of the article, the slides supporting the frame, and the means for displacing the spindles in the direction perpendicular to the direction of unwinding of the article being placed to act between the carriage and the frame.

Thus it is possible, by means of a set of tracks and a set of slides placed respectively longitudinally and transversely with respect to the direction of unrolling of the cable or the tube, to suitably position the two spindles of the winch to unroll a previously chosen spool or one which may be of different dimensions.

Advantageously, the device includes means for blocking or securing the carriage on at least one of the tracks, and each track is an I-beam. The blocking means includes at least one part mounted to pivot on the carriage around an axis basically parallel to the track, and this part includes a clamp able to engage during pivoting, under the upper flange or rail of the beam which supports the frame, and to grip the rail.

Advantageously, the blocking means can include at least two parts mounted to pivot on both sides of the plane of the upright web of the beam, one of these parts supporting in rotation the end of a screw, and the other part supporting a nut in which the screw is engaged, the screw being able by its rotation to cause the simultaneous gripping or releasing of the clamps of the parts, each on one side of the rail.

According to one embodiment of the invention, the device includes connecting means between the spindles.

This arrangement is particularly interesting when the device is installed on a support ship. Actually, during tilting of the device due to the pitch or rolling of the support ship, the swinging couple applied by the spool on one of the spindles is thus shared equally by the other spindle, which allows the load to be better distributed.

These connecting means may include, for example, at least one part sliding inside the center of one or both spindles, this part being able to be connected to the other spindle, and a screw fixed in translation with respect to the spindle, acting with a nut fixed in rotation borne by the sliding part and maneuvered by rotation of the screw.

Other characteristics and advantages of the invention will appear in the following description of one embodiment given by way of a non-limiting example.

In the attached schematic drawings,

FIG. 3 is a detail view, partially in section, of the spool drive;

FIG. 4 is another detail view, also partially in section, of the beam clamp;

FIG. 5 is a sectional view of the detail shown in FIG. 4; and

FIGS. 6 to 11 show schematic top views of the different steps for unwinding cable or tubing using the embodiments of the invention.

Figure 1:
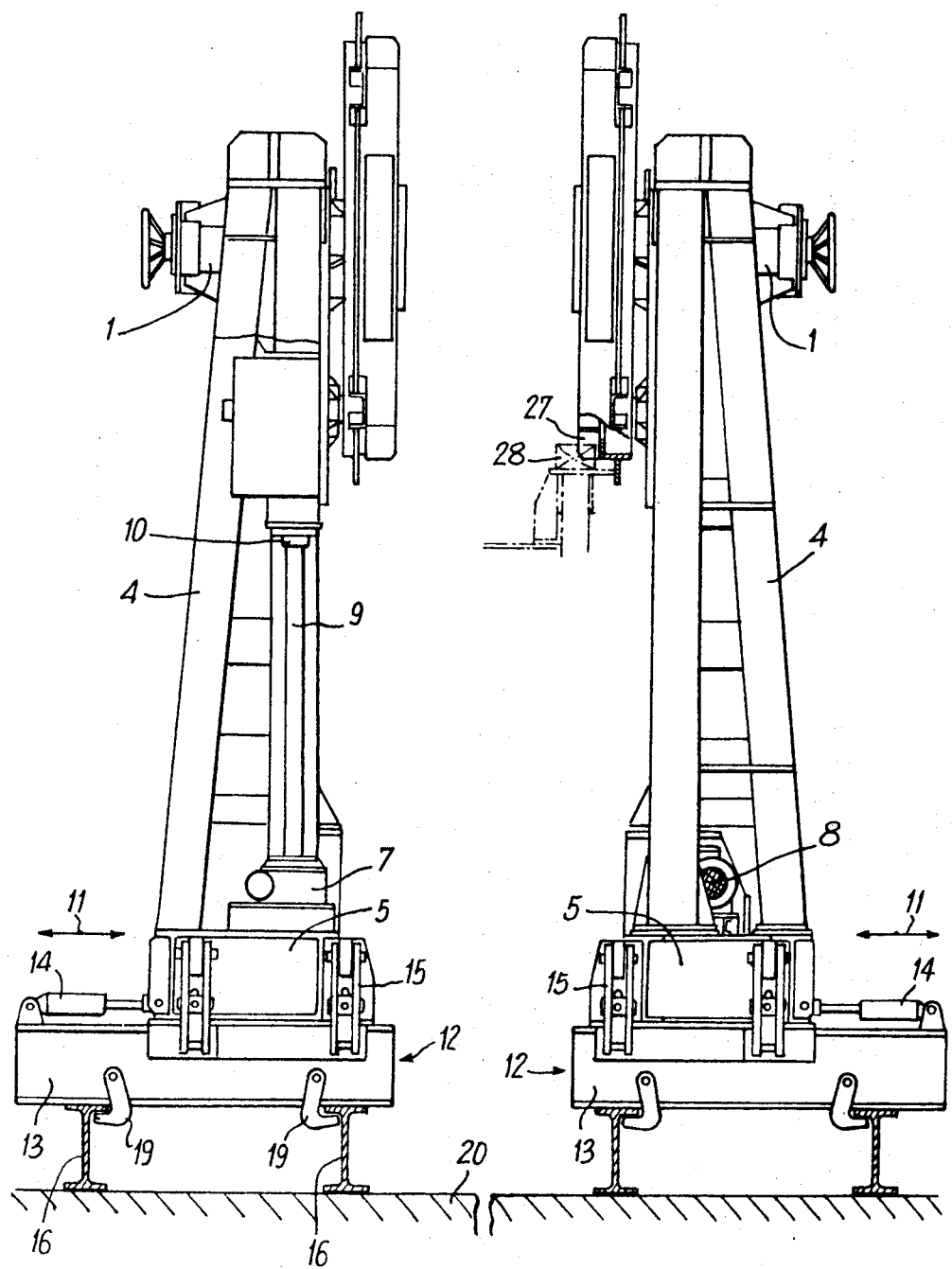
FIG. 1 is a front view of the device according to the invention, partially in section.

As shown on the drawing, the device in general includes two spindles 1 mounted respectively on supports 2 each sliding in vertical guides 3 provided on opposed frameworks 4. Each framework 4 is generally trapezoidal in shape and includes a lower beam 5 on which are fixed two triangular frames 6 and 6', connected at their upper ends by a connecting beam 6".

Figure 2:
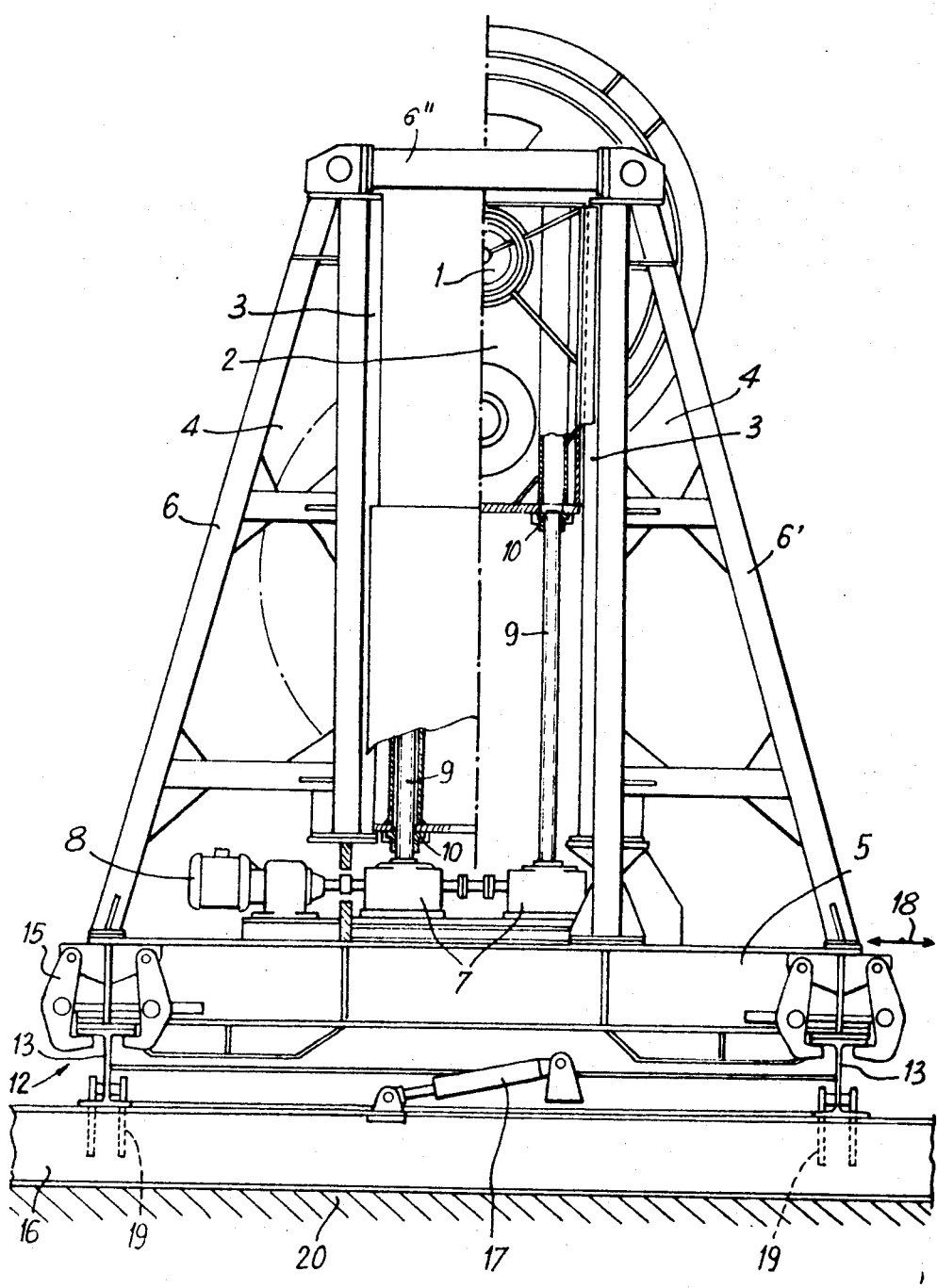
FIG. 2 is a side view of the device, partially in section.

The means for moving the sliding support 2 in the vertical guides 3 of frames 6 and 6', comprises two screw-jacks 7 mounted on beam 5 and operated by a reversible motor 8. The screws 9 of the screw-jacks 7 cooperate with nuts 10 fixed to the lower portion of the sliding support 2, to displace this support 2 between a lower position shown at the left side of FIG. 2 and an upper position shown at the right side of FIG. 2.

Each beam 5, and consequently, each assembly mounted thereon, as described above, is mounted to slide in the direction of arrows 11 on the respective carriages 12. In the embodiment shown in the drawings, each carriage 12 is basically formed of two I-beams 13 forming slides for the beams 15. The cylinder jacks 14 which are connected to carriage 12 and the end of whose shaft is connected to beam 5, provide means for controllably displacing a framework 4 on slides 13. Also, the blocking or locking means 15 described in greater detail below, allow each framework 4 to be immobilized on its slides 13.

The carriages 12 are themselves each so mounted as to move on two tracks 16 perpendicular to slides 13 of carriages 12. Cylinder-jacks 17 whose body is attached to carriage 12 and the end of whose shaft can be removably fixed on track 16, provide for step-by-step displacement of carriage 12 on tracks 16 in the direction of arrows 18. Moreover, additional blocking or locking means 19 are provided to immobilize carriage 12 on these tracks 16.

Finally, in the embodiment shown on the drawings, the tracks 16 are fixed on the deck 20 of a support ship or barge.

As shown more particularly in FIG. 3, each spindle 1 has a hollow hub 21 mounted to rotate by means of bearing rollers 22 on the sliding support 2. The hub 21 has, on the side facing the other spindle 1, a plate 23 on which is fixed an internally toothed ring gear 24. The toothed gear 24 meshes with a drive pinion 25 of a motor 26 also mounted on the sliding support 2.

Plate 23 also has means 27 (FIG. 1) able to act with complimentary means 28 of a spool to drive it in rotation, as well as an opening 29 large enough to permit the passage of an operator.

At its end opposite plate 23, the hub 21 has a closure plate 30 in which a screw 31 is fixed longitudinally but which can be driven in rotation by means of a drive wheel 32. This screw 31 cooperates with a nut 33 fixed to a sliding part 34 guided by and blocked against relative rotation with respect to core 21 by means of a part 35. At its end opposite screw 32, the sliding part 34 has a clevis 36 for locking an eyelet formed at the end of a cable connected to the hub of the other spindle 1, for example, by means of a device identical to the device 30 to 36.

As shown more particularly in FIGS. 4 and 5, each blocking or immobilizing device 15 has two pivoting hooks 37 mounted by pins 38 on support beam 5. These hooks 37 have at their end a clamp 39 able to engage beneath the upper rail 40 of track 13, one on each side of the web 41 of the track to grip this rail.

Control of blocking means 15 is achieved by means of a screw 42 of which one end 43 is mounted to rotate on one of the hooks 37 and includes a working end 44. The other end of screw 42 threads into a nut mounted on the other pivoting means 37.

In the embodiment shown in the drawings, the locking means 19 are shown to have only a single pivot and act with the upper rail of tracks 16, but of course they could be made in the same manner as locking means 15.

The device which has just been described is used in the following manner:

Several spools 45 (FIG. 6) are placed on the deck 20 of a support ship between the two pairs of tracks 16 with their axes perpendicular to these tracks, that is to say, perpendicular to the longitudinal axis of the ship. Each of these spools carries a certain length of flexible cable or tube to be laid.

By means of cylinder-jacks 17, the two carriages 12 are displaced step-by-step along the tracks 16 until the spindles 1 are located in the extension of the axis of the first spool 45a. The locking means 19 are then operated to immobilize the carriages 12 on tracks 16.

The cylinder jacks 14 are then operated to move the frameworks 4 toward each other and consequently the spindles 1 toward the sides of spool 45a until they enclose the sides and grip the spool. Blocking means 15 are then operated to immobilize each framework 4 on its carriage 12.

Motor 8 is then activated to cause the screw jacks 7 to lift the sliding support 2 and consequently the spool 45a.

When the spool has been raised high enough above the deck 20 of the ship, the cable or tube 46 is unwound by means of motor 26, through a channel 47 (FIG. 6), at the back of the support ship.

When the spool 45a has been entirely unwound, the trailing free end 48 of the cable or tube 47 is kept on the deck 20 of the support ship by any known means 49 (FIG. 7).

Spool 45a is then replaced on the deck of the support ship by operating screw jacks 7.

Cylinder-jacks 14 are again operated to separate frameworks 4 and, consequently, the spindles 1 from the sides of spool 45a (FIG. 8), after which cylinder jacks 17 are operated to displace carriages 12 step-by-step along tracks 16 until the spindles 1 are located in the extension of the axis of the second spool 45b (FIG. 9).

By the operation of the cylinder-jacks 14, the frameworks 4 are again displaced on slides 13 so that the spindles 1 come to grip the sides of spool 45b (FIG. 10).

Spool 45b is then lifted by means of screw jacks 7 and motor 26 is operated to unwind the end 50 of the cable or tube borne by spool 45b until this end approaches the trailing end 48 of cable or tube 46. A connection 51 is then made between the ends 48 and 50, after which the tension of the cable or tube is taken up again by the winch and holding means 49 is released. Motor 26 is again put in operation to unwind the cable or tube borne by spool 45b (FIG. 11).

These operations may be repeated as often as necessary until all the cable or tube on the set of spools 45 has been exhausted.

If the cable or tube is to be taken up again, the same operations are carried out in reverse order.

Numerous variations may be made in the device described above and in its means of use without exceeding the scope of the invention.

Thus, for example, several rows of spools 45 could be arranged on the deck 20 of the support ship including on both sides a pair of tracks 16. Two assemblies of a spindle 1 and its means of displacement can be provided for each row of spools, unless the ship has enough handling means to displace the sets from one row to another.

Thus it should be understood that the device according to the invention has much greater flexibility than do previously known devices. It avoids all transshipment since the support ship may be loaded upon leaving the factory where the cables or tubes to be laid are made. A line of great length may thus be laid without the support ship returning to port.

What is claimed is:

1. A system for winding or unwinding lengths of an enlongated flexible article one after the other from a plurality of spools each having an axis and on which a length of the article can be wound or unwound by rotation of a spool about its axis,
   at least two of such spools being supported with their axes perpendicular to the direction of the article during unwinding,
   at least two opposed spindles forming a winch having an axis generally perpendicular to the direction of the article during unwinding,
   means for displacing said spindles in a first direction generally horizontally and perpendicular to an axis of a supported spool;
   means for displacing said spindles in a second direction generally horizontally and perpendiculr to said first direction; and
   means for displacing said spindles vertically.

2. A system according to claim 1 further comprising a generally horizontal surface supporting the spools, and
   means mounted on said surface for supporting said spindles.

3. A system according to claim 1, wherein each spindle is mounted on a support slidable vertically in a frame, and said means for displacing said spindles vertically comprises means connected between each support and a frame.

4. A system according to any one of claims 1 to 3 further comprising at least two tracks parallel to the direction of unrolling of the article, on each side of a receiving zone for the spools, said tracks supporting a carriage carrying said frames, and said means for displacing the spindles in said first direction comprises means for displacing said carriage along said tracks.

5. A system according to claim 4, wherein said carriage comprises at least two slides placed perpendicular to said first direction, said slides supporting said frames and said means for displacing the spindles in said second direction comprises means acting between said carriage and said frames.

6. A system according to claim 4, further comprising means for locking the carriage to at least one of said tracks, said track comprises an I-beam, said blocking means comprising at least one means mounted to pivot on the carriage around an axis basically parallel to a track and including a clamp engageable by pivoting, under an upper flange of the beam which supports the carriage, to grip said flange.

7. A system according to claim 5, further comprising means for locking a frame on at least one of the said slides, said slide comprises an I-beam, said locking means including at least one means mounted to pivot on a frame around an axis basicaly parallel to the said slide and including a clamp engageable by pivoting under the upper flange of the beam which supports a frame to grip said rail.

8. A system according to claim 7 wherein said locking means include at least two pivoting clamp means mounted one on each side of the plane of the web of said beam, one of the said means supporting in rotation the end of a screw, and the other means supporting a nut in which the screw is engaged, said screw upon rotation causing simultaneous engagement of the clamp means, one against each side of said flange.

9. A system according to claim 1 further comprising connecting means connected between said spindles.

10. A system according to claim 9, wherein said connecting means comprises at least one slide inside a hub of one of said spindles, means for connecting said slide to the other spindle, and a screw fixed against axial translation with respect to the said hub and threadedly engaging a nut fixed against rotation and carried by said slide, said nut moving said slide in response to relative rotation of said screw.

11. A system according to claim 10, where each spindle has a screw and a slide, and means on each slide for connecting said connecting means between free ends of said slides.

12. A system according to claim 10 wherein each spindle has a plate which extends across a central opening of the spool, at least one of the plates having an opening to allow passage of an operator for connection of the connecting means.

13. A system according to claims 1 or 2 in which the system is installed on a ship.

* * * * *

UNITED STATES PATENT AND TRADEMARK OFFICE
CERTIFICATE OF CORRECTION

PATENT NO. : 4,284,249
DATED : August 18, 1981
INVENTOR(S) : LUCIEN LEGALLAIS et al It is certified that error appears in the above—identified patent and that said Letters Patent is hereby corrected as shown below:

On the title page, item [75] "Lucien Legallasi" should read
--- Lucien Legallais ---.

Signed and Sealed this

Twentieth Day of October 1981

[SEAL]

Attest:

GERALD J. MOSSINGHOFF

*Attesting Officer*    *Commissioner of Patents and Trademarks*